United States Patent
Stocker

(10) Patent No.: US 7,725,287 B2
(45) Date of Patent: May 25, 2010

(54) SYSTEM AND METHOD FOR USING STRUCTURED SHAPES TO INCREASE LASER SCANNER ACCURACY

(75) Inventor: David G. Stocker, Roanoke, VA (US)

(73) Assignee: TM GE Automation Systems, LLC, Roanoke, VA (US)

( * ) Notice: Subject to any disclaimer, the term of this patent is extended or adjusted under 35 U.S.C. 154(b) by 121 days.

(21) Appl. No.: 12/110,327

(22) Filed: Apr. 27, 2008

(65) Prior Publication Data

US 2009/0030647 A1 Jan. 29, 2009

Related U.S. Application Data

(60) Provisional application No. 60/952,329, filed on Jul. 27, 2007.

(51) Int. Cl.
*G01P 11/00* (2006.01)
(52) U.S. Cl. ...................................................... 702/152
(58) Field of Classification Search ................. 702/152; 273/348
See application file for complete search history.

(56) References Cited

U.S. PATENT DOCUMENTS 5,988,645 A * 11/1999 Downing ..................... 273/348

FOREIGN PATENT DOCUMENTS

JP 05330618 A * 12/1993

OTHER PUBLICATIONS

"Technical Description—LMA 200/211/220/221/291 Laser Measurement Systems", SICK AG, 8 008 970/WU.FD/Jun. 2000, p. 6, Fig. 3-2.

* cited by examiner

*Primary Examiner*—Tung S Lau
*Assistant Examiner*—Xiuquin Sun
(74) *Attorney, Agent, or Firm*—Woods Rogers PLC; Peter E. Rosden

(57) ABSTRACT

A system and method for determining the rectangular coordinate position of a first object spaced apart from and opposing a second object by placing at least three three-dimensional structures at different known locations on the top surface of the first object and a corresponding number of pulse transceivers at known locations on the bottom surface of the second object, directing a series of pulses having a known speed from each of the transceivers along a path crossing the highest point of a corresponding one of the structures, determining the shortest and second shortest distances travelled by the transmitted pulses and using that data together with other known data to locate edges of the first object and calculate the rectangular coordinate position of the first object with respect to the second object.

5 Claims, 12 Drawing Sheets

SYSTEM AND METHOD FOR USING STRUCTURED SHAPES TO INCREASE LASER SCANNER ACCURACY

CROSS REFERENCE

This application claims the benefit of U.S. Provisional patent application No. 60/952,329, filed Jul. 27, 2007, which is incorporated herein by reference in its entirety.

TECHNICAL FIELD

The subject invention relates generally to a system and method for use in determining the relative position of two objects by detecting the position of the edges of one object with respect to the other object. More particularly, this invention reduces measurement uncertainties relative to the measurement accuracies required for automatic container handling by establishing the position of a spreader with relationship to a trolley.

BACKGROUND OF THE INVENTION

Automatic container handling is typically accomplished by means of a crane having a generally rectangularly shaped movable trolley 10 located on a repositionable frame 15 as shown in FIG. 1. A generally rectangularly shaped spreader 20 is used both to move containers 25 onto a stack located on the ground beneath the frame 15 and to pick up containers 25 from such a stack. Spreader 20 is typically connected to trolley 10 by means of cables for raising and lowering the spreader. In order to avoid creating an unstable, leaning stack while loading and to efficiently pick up containers and since spreader 20 moves independently of trolley 10, it is critical that the location of spreader 20 in relationship to trolley 10 be determined as accurately as possible at specific points in time and that the location of the stack also be determined as accurately as possible. Such position data is typically obtained by means of a vision scanner system to guide and control movements of trolley 10 and spreader 20 during pick-up and drop-off of containers in a stack. An example of such a system is the Maxview® Crane Scanner System developed by TM GE. Maxview® is a registered trademark belonging to TM GE Automation Systems LLC. Maxview® uses a combination of sensors and TM GE proprietary software to measure the relative position of the spreader and container below the crane, as is generally illustrated in FIG. 1. In the typical system used in automatic container handling, a crane computer controller provisionally positions frame 15 and trolley 10 at the expected position of container 25. An exemplary arrangement for such a control system is presented in FIG. 2. The expected position is retrieved from a database maintained by the crane computer controller. Once frame 15 and trolley 10 arrive at the expected position, some means must be used to more precisely, finally position spreader 20 over container 25. A variety of systems have been used to accomplish this goal.

LIDAR (Light Detection and Ranging) devices, also referred to as "laser sensors" or "laser scanners", are one possibility. Sensors 30 (not visible in FIG. 1) are typically affixed at a known position to trolley 10 and provide a distance and angle measurement of a series of points from the reference point of the sensor. Such sensors measure distance via the "time of flight" method. Each LIDAR sensor 30 emits a pulse of laser light, and then precisely measures the time until the pulse, or some part of it, is reflected back. This time is then multiplied by the speed of light to obtain a distance measurement. So-called laser rangefinders use this technique to make one-dimensional distance measurements.

FIG. 2 illustrates the operation of this type of system for a one-dimensional distance measurement. At time t=0, the LIDAR sensor 30 begins to transmit (Tx) a first laser pulse 40 towards target 45 as shown in the left-hand portion of FIG. 2. Target 45 is located an unknown vertical distance d away from sensor 30 as shown in the right-hand portion of FIG. 2. Laser pulse 40 reaches target 45 in one-half of the time (T) necessary for the roundtrip of pulse 40 back to LIDAR sensor 30 as shown in the middle portion of FIG. 2. When pulse 40 is received (Rx) back at LIDAR sensor 30, the total time T for its transit time is known, as shown in the right-hand portion of FIG. 2, and is recorded. The distance d can then be calculated according to the formula:

$$d = \tfrac{1}{2} T * \text{Speed of Light}$$

The laser scanner can also be used to take the measurement concept one step further—into two-dimensions. A rotating mirror 35 (not visible in FIG. 1) which is physically integrated into sensor 30 is used to direct the laser pulses over a range of angles. This process provides individual distance measurements at the corresponding mirror angles to different profile points. These points form a two-dimensional profile, or cross-section, of the area being scanned. In FIG. 3, rotating mirror 35 is used to rapidly direct a plurality of laser pulses originating in LIDAR sensor 30 over a range of angles towards target 45. As a result, data from a multiplicity of measuring points 50 are obtained enabling distance measurements to be obtained corresponding to the mirror angles and a two-dimensional profile, or cross-section, of the scanned area to be developed. The TM GE proprietary Crane Scanner System software receives the discrete scan point measurements provided by the laser scanners, detects the edges of key objects within the laser scans, and reports measurements of these edge positions in various coordinate systems to the Maxspeed® crane control system. Maxspeed® is a registered trademark belonging to TM GE Automation Systems LLC. The Maxspeed® system uses these measurement positions to guide the spreader to the target container for automatic container pick-ups and landings (stacking).

As shown in FIG. 4, the known techniques of edge detection and measurement are limited in accuracy by the scan point resolution of the laser scanner. Spot-to-spot resolution ss (the difference between the centers of two adjacent spots) and spot diameter sd of commercially available, robust and economical laser scanner units suitable for use in crane applications cause large measurement uncertainties relative to the measurement accuracies required for automatic container handling. Actual edge positions x measured with such laser units differ substantially from measured edge positions y resulting in an undesirable degree of measurement uncertainty z. Furthermore, spot diameter, as shown on the y axis of the graph depicted in FIG. 5, becomes larger as the range, shown on the x axis of the graph depicted in FIG. 5, increases. This increase occurs since the laser beam being used in this application is intentionally given angular beam divergence at least as great as the angular resolution desired by appropriately setting the laser cavity geometry and employing matching optics within the path of light in the LIDAR itself. As a result, assurance is obtained that any object within the total scan angle will be hit by at least some part of the laser pulse. In addition, as the range increases, both the spot diameter and the distance between spots in millimeters increases, as shown in FIG. 6, thereby further reducing scanner accuracy using known methods. Further support for this conclusion is provided by "Technical Description—LMS 200/211/220/221/

291 Laser Measurement Systems," SICK AG, 8 008 970/ WU.FD/06-2000, p. 6, FIG. 3-2.

What is needed, therefore, is a system and method for using pulse emitters such as laser scanners on existing cranes which improves the accuracy of target edge detection to overcome the problems discussed above.

SUMMARY OF THE INVENTION

This invention relates to a system and method for establishing the rectangular coordinate location of a first object having a known shape and known dimensions with respect to a second object which also has a known shape and known dimensions where the bottom surface of the second object opposes and is spaced away from the top surface of the first object. At least three three-dimensional target shapes having at least one edge or point with a higher elevation than any other edge or point of the target shape are attached to the top surface of the first object at known locations and orientations, and at least three pulse emitting means capable of emitting pulses at a known speed are attached to the bottom surface of the second object at known locations and orientations. Each emitter transmits a series of pulses each at a known angle towards one of the target shapes over a known path for a known period of time where the known path crosses the highest point of the target shape. A pulse receiver is co-located with each of the pulse emitters to receive pulse reflections back from the target shape. Computer means measure and store the elapsed time between each pulse emission and each pulse reflection reception and use this data together with other known data to calculate both the rectangular coordinate location of the highest and second highest elevation of each of the target shapes and the corresponding rectangular coordinate location of edges of the first object with respect to the second object.

BRIEF DESCRIPTION OF THE DRAWINGS

The foregoing and other objects, aspects and advantages of the invention will be better understood from the following detailed description of the invention with reference to the drawings, in which.

DETAILED DESCRIPTION OF THE PREFERRED EMBODIMENT OF THE INVENTION

Figure 1:
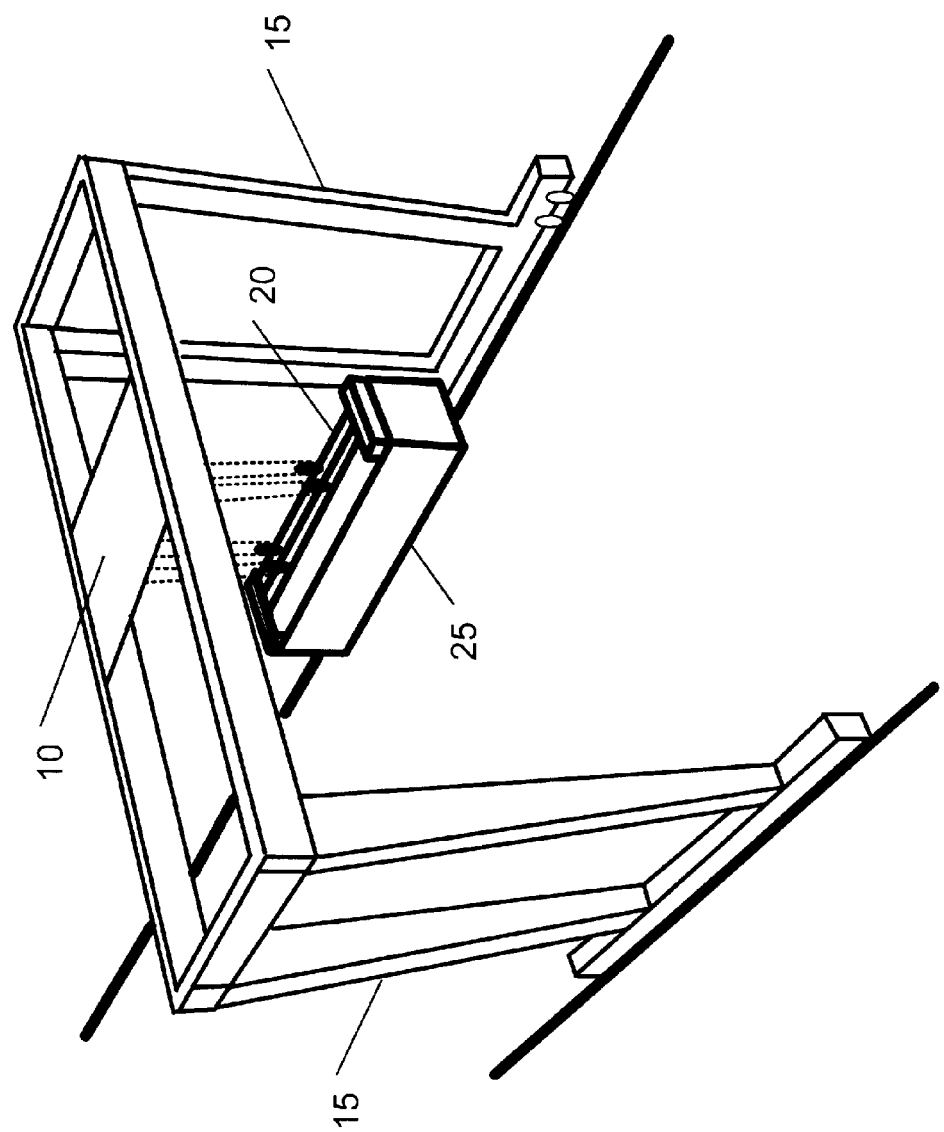
FIG. 1 is an illustration of a perspective view of the basic components of a container crane.
Figure 2:
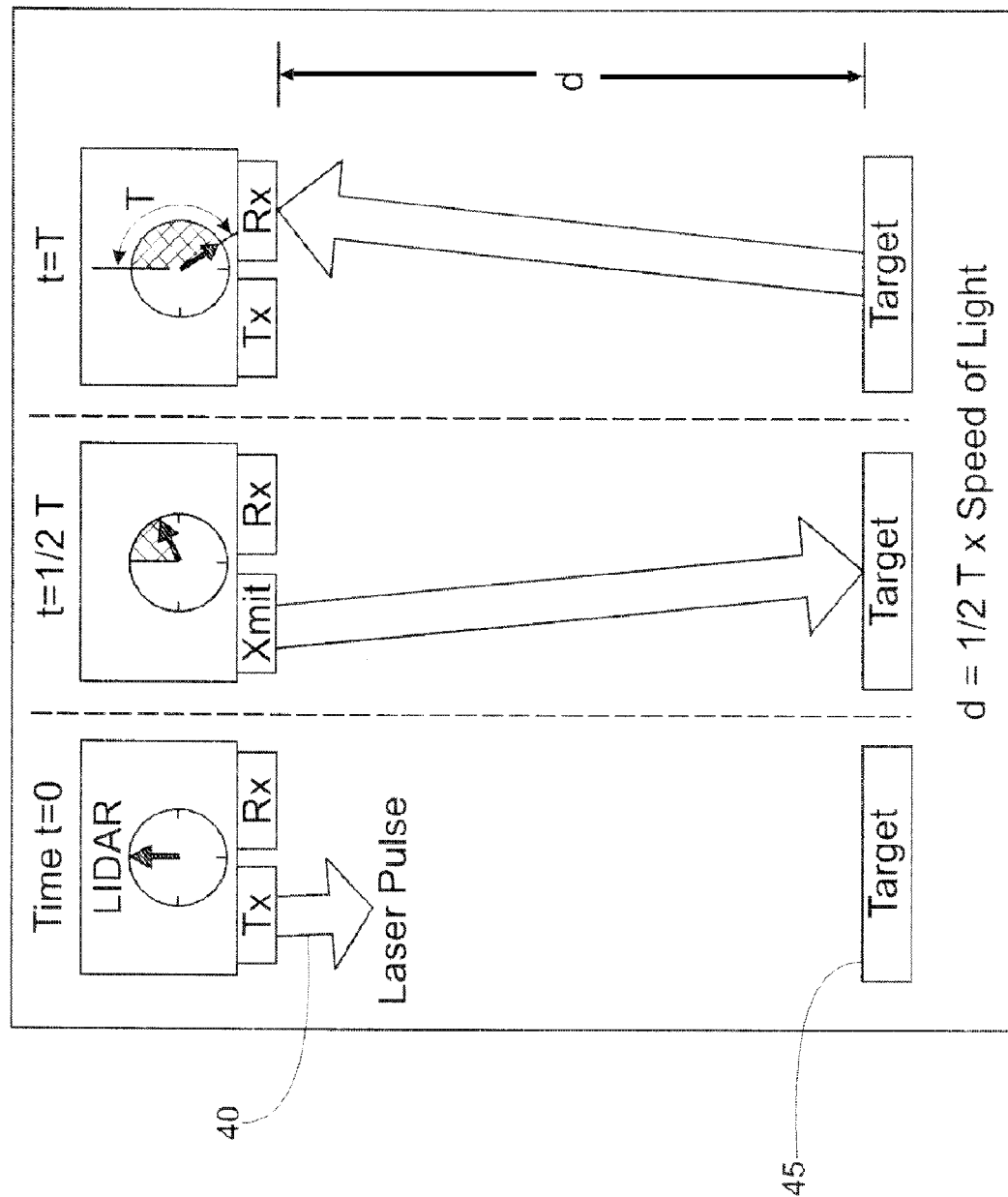
FIG. 2 illustrates time-of-flight LIDAR measurements.
Figure 3:
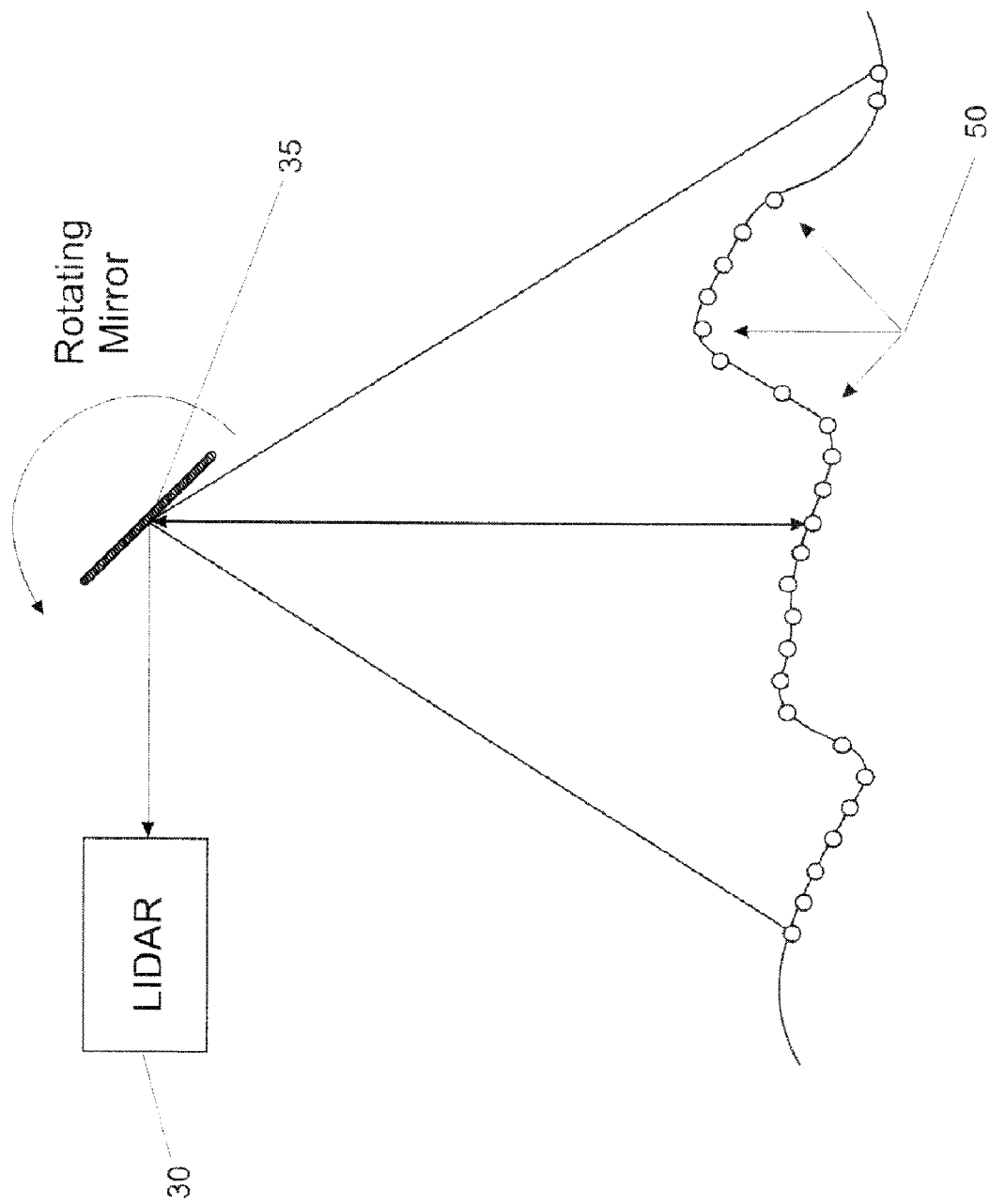
FIG. 3 depicts an example of the working of a laser scanner when providing measured profile points.
Figure 4:
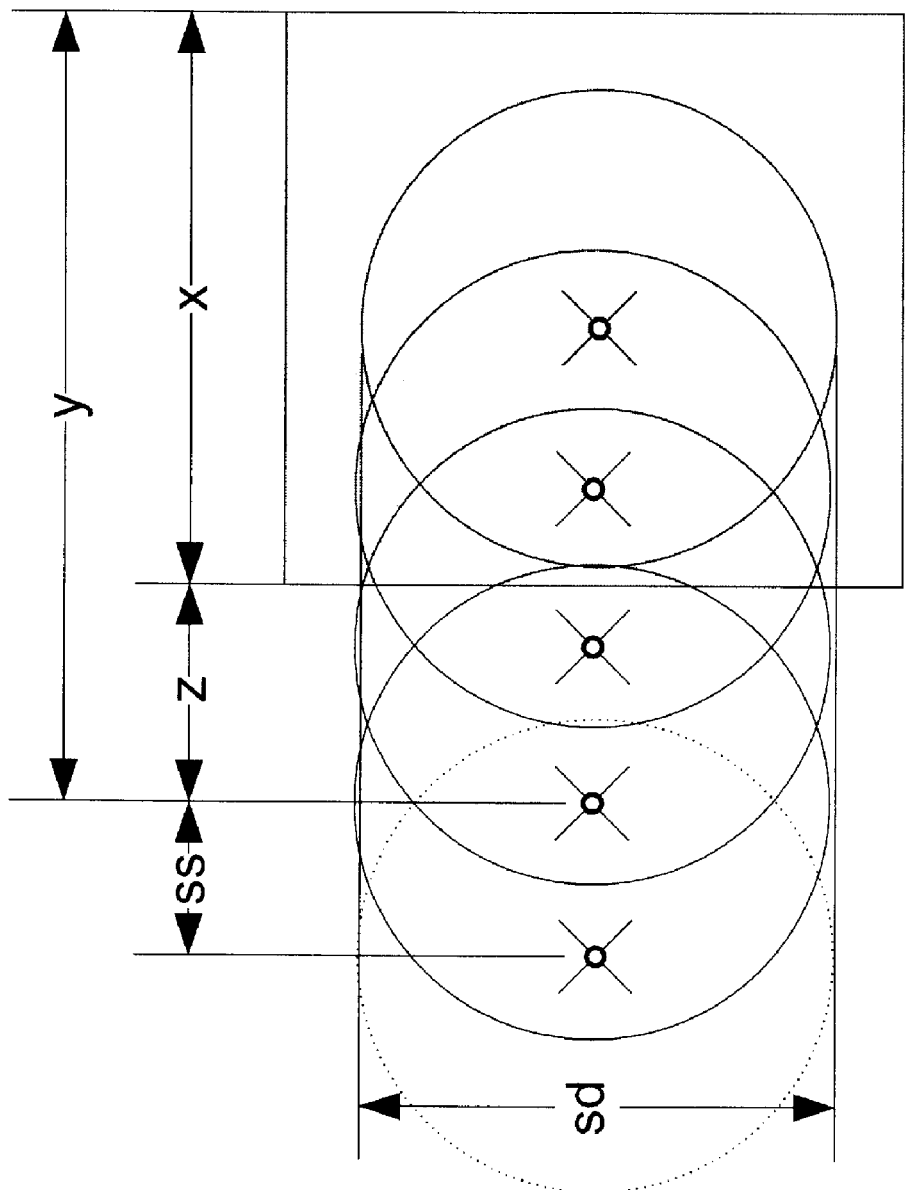
FIG. 4 exemplifies measurement uncertainty caused by laser spot resolution and size.
Figure 5:
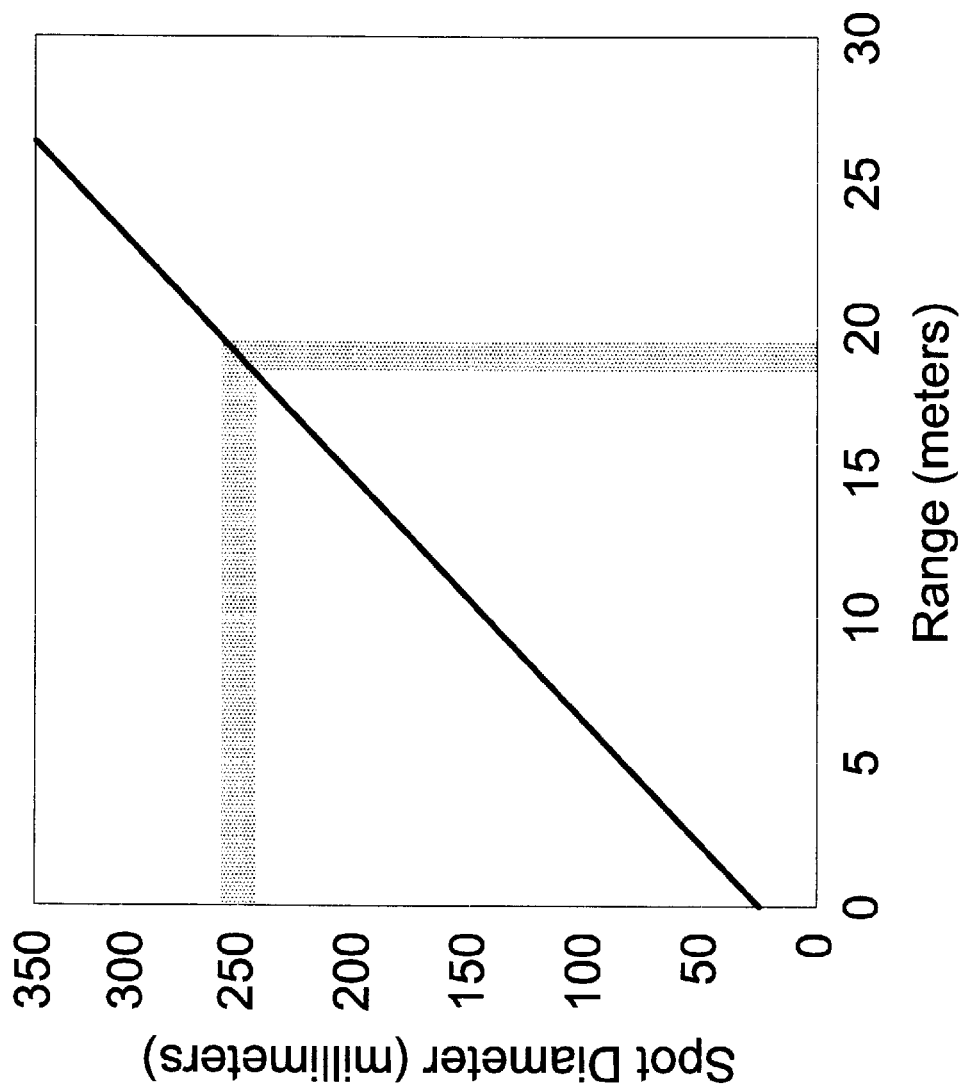
FIG. 5 is a graph displaying LMS 211 Spot Diameter vs. Range.
Figure 6:
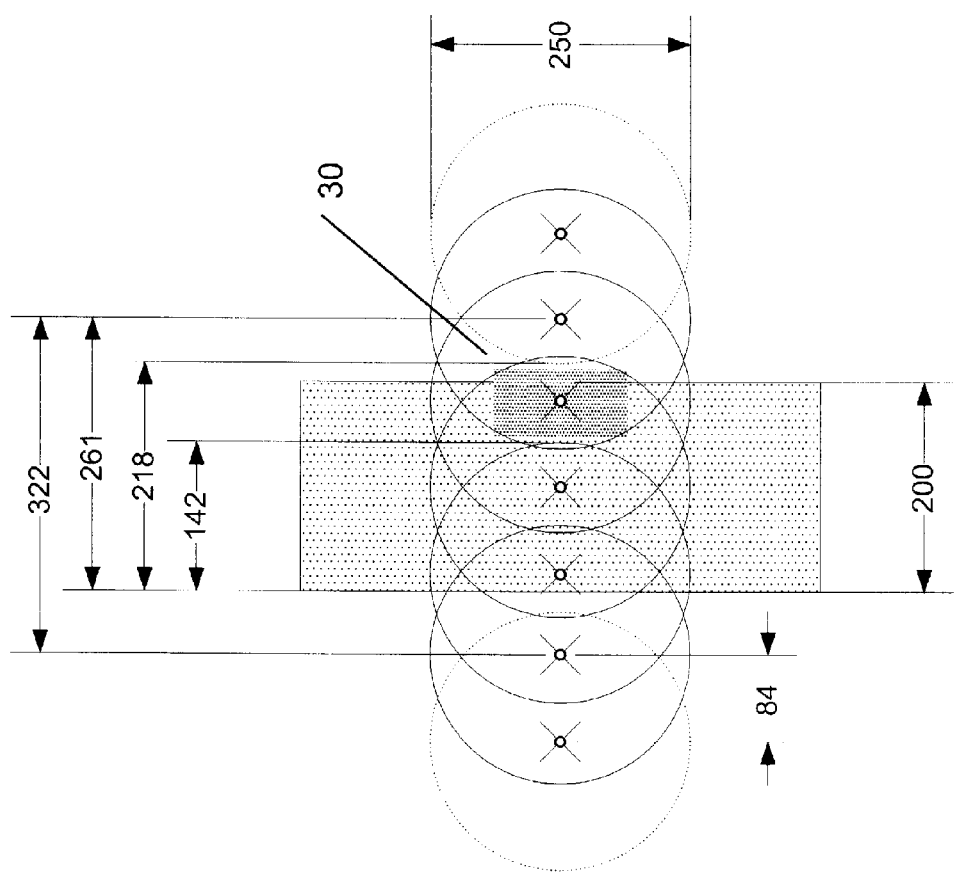
FIG. 6 is a diagram showing Spot Diameter vs. Edge Position Measurement.
Figure 7:
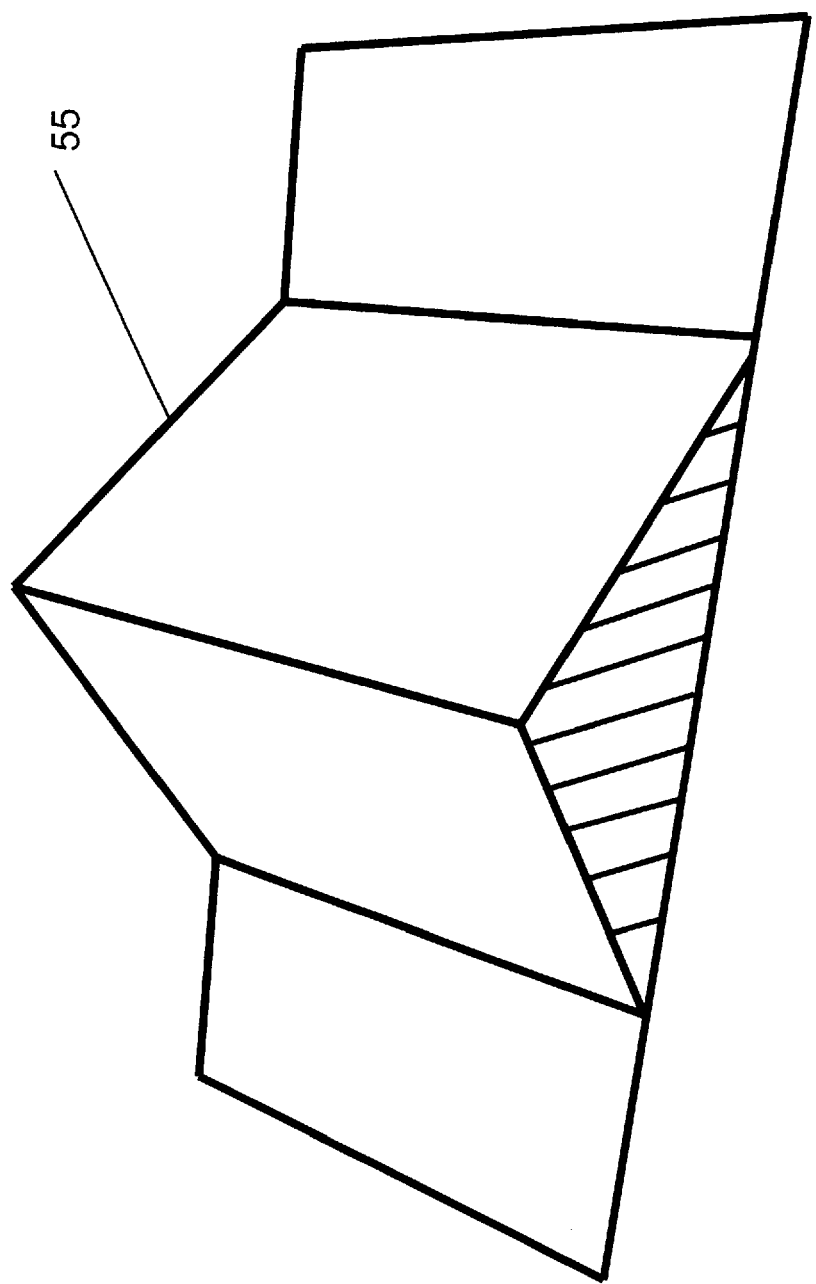
FIG. 7 shows a reference target shape for placement on a spreader.
Figure 8:
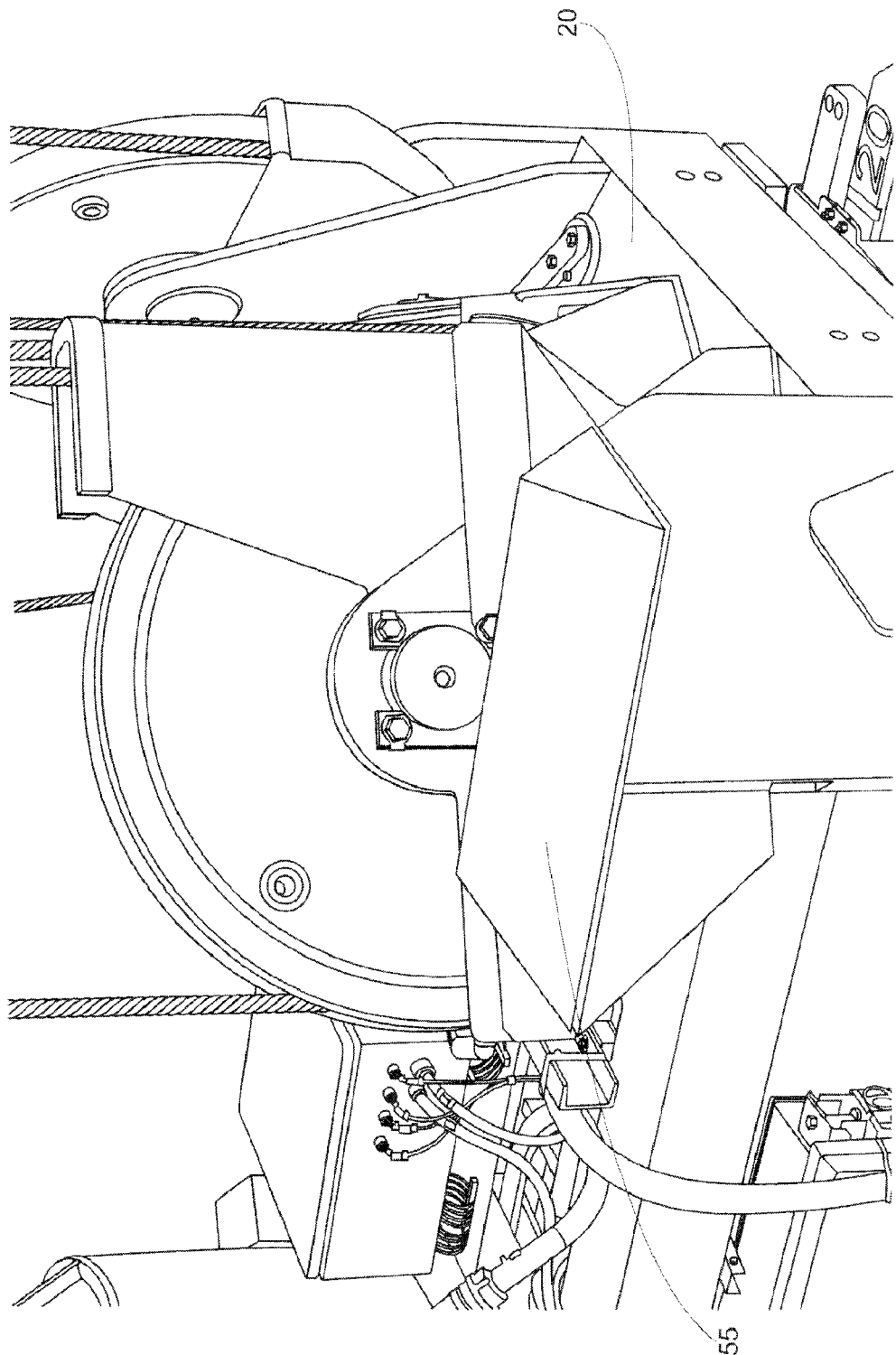
FIG. 8 shows placement of a triangular target shape on a spreader.

While edge detection measurement by prior art methods are subject to measurement uncertainty caused by beam spot resolution and size, the method of this invention uses structured shapes to increase laser scanner accuracy. Distance measurement provided by a laser scanner for each scan point is more accurate than the lateral edge measurement resolution (due to the factors described with reference to FIG. 4 above) by an order of magnitude. Therefore in this invention a structure is provided on the spreader of the crane that serves as a reference target within the scan. This reference target is constructed so as to utilize both the lateral and distance measurements of the points within the scan, in order to provide a much more accurate measurement of the position of the spreader than by means of edge detection alone. An example target shape 55 is shown in FIG. 7. Whereas sensor 30 is located on trolley 10, target shape 55 is situated on spreader 20. Sensor 30 is preferably a transceiver including a pulse transmitter and a co-located pulse receiver. Each sensor 30 may, for example, be a model LMS 211 or model LD-LRS 2100 manufactured by SICK Inc., although similar sensors from other manufacturers may also be used. Target shape 55 is preferably a right triangle with the 90° edge oriented perpendicular to laser sensor 30. Placement of such a triangular target shape 55 on spreader 20 is illustrated in the perspective view of FIG. 8. Target shape 55 may be any other three-dimensional structure such as, for example, a pyramid so long as the configuration of the target shape and its dimensions are known and at least one edge and/or at least one point of the target shape has a known peak elevation which is higher than other parts of the target shape. Target shape 55 must be constructed with a surface which allows reflection back in all directions of some part of the pulse striking its surface. It may, therefore, not have a mirror surface but must instead have a surface which permits a dispersive reflection of energy pulses which may strike it. Furthermore, target shape 55 may be located anywhere on spreader 20 rather than perpendicular to laser sensor 30 so long as the location of target shape 55 is known, the scan path of sensor 30 is adjusted to pass over a highest elevation point of target shape 55 during expected/nominal operating conditions and appropriate adjustments are made to the equations presented below to account for the location of target shape 55. It is also irrelevant whether the peak of the target shape runs parallel to an edge for purposes of determining the spreader's edge since any resulting offsetting angle is known and accounted for in configuring software during system setup. Once the positions of target shape 55 and the respective sensor 30 are established while trolley 10 and spreader 20 are at a zero or rest position, their exact position and orientation with respect to the center of trolley 10 are known, as are fixed parameters representing their positions in all six degrees of freedom, i.e. on the X, Y and Z axes including their respective angular interrelationships.

In actual use for automatic container handling, it is necessary to position at least three sensors 30 on rectangularly shaped trolley 10 and corresponding target shapes 55 on spreader 20. Since the width and length of the container being handled is known, three pairs of sensors 30 and target shapes 55 are required to properly position spreader 20 by accounting for all six degrees of freedom in which spreader 20 may move. The first sensor 30 is located at one end of trolley 10.

Figure 9:
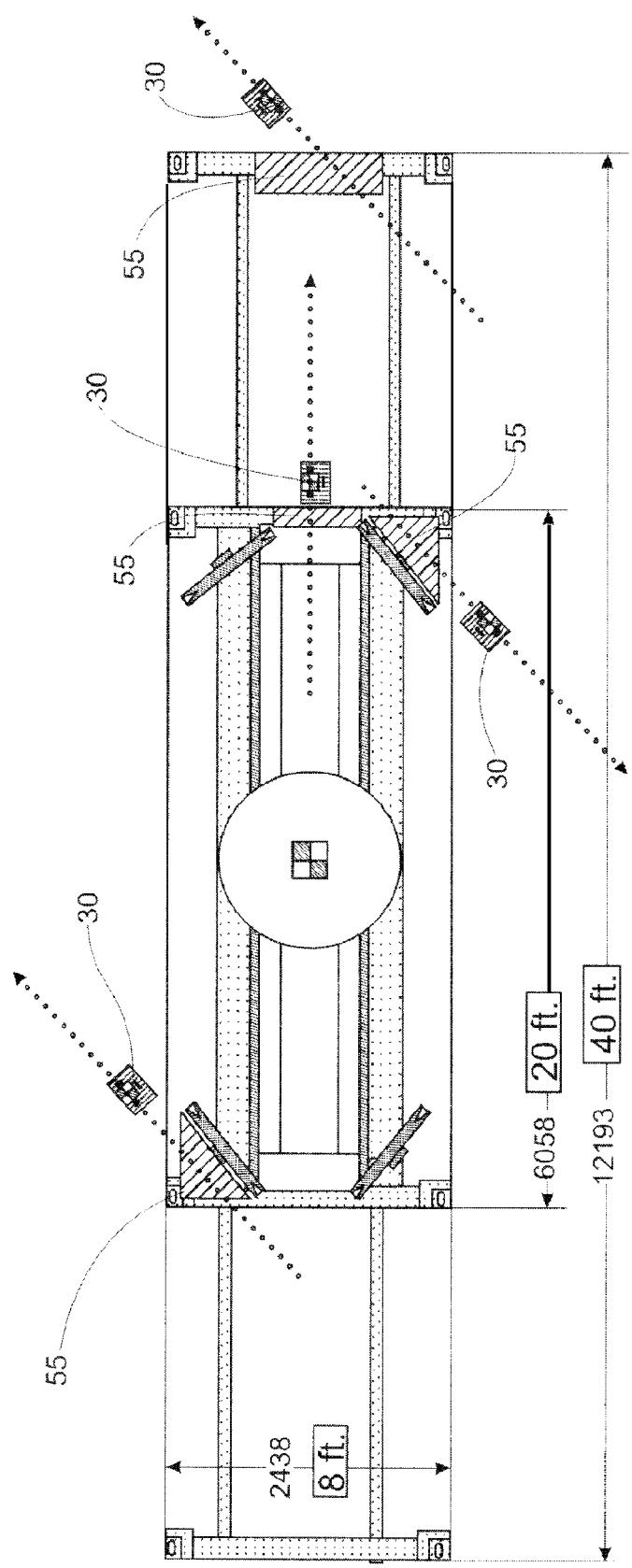
FIG. 9 provides a flat overhead view of a spreader with four target shapes mounted thereon and four sensors from a trolley visually superimposed thereon.

The second sensor 30 is located on one long side of trolley 10, while the third sensor 30 is located on the opposite side of trolley 10 from the second scanner. The respective target shapes 55 may be located generally opposing each sensor 30 but need not be so, as explained previously. Furthermore, since there are currently three standard container lengths of 20, 40 and 45 feet, three pairs of sensors and corresponding target shapes should be located at one or the other end of trolley 10 and on spreader 20 at positions corresponding to the 20, 40 and 45 foot container lengths to provide full operational flexibility. Thus, a fully flexible configuration would require five pairs of sensors and corresponding target shapes. Of course, a greater or lesser number of pairs of scanners and target shapes may be used, if desired so long as the configuration includes a minimum of three such pairs. An exemplary flat overhead view of a spreader 20 with four target shapes 55 mounted thereon and the corresponding four sensors 30 separately mounted on trolley 10 visually superimposed thereon is shown in FIG. 9 where distances are expressed in millimeters. The angles at which the sensors 30 deviate from the perpendicular can vary depending on the application.

Figure 10:
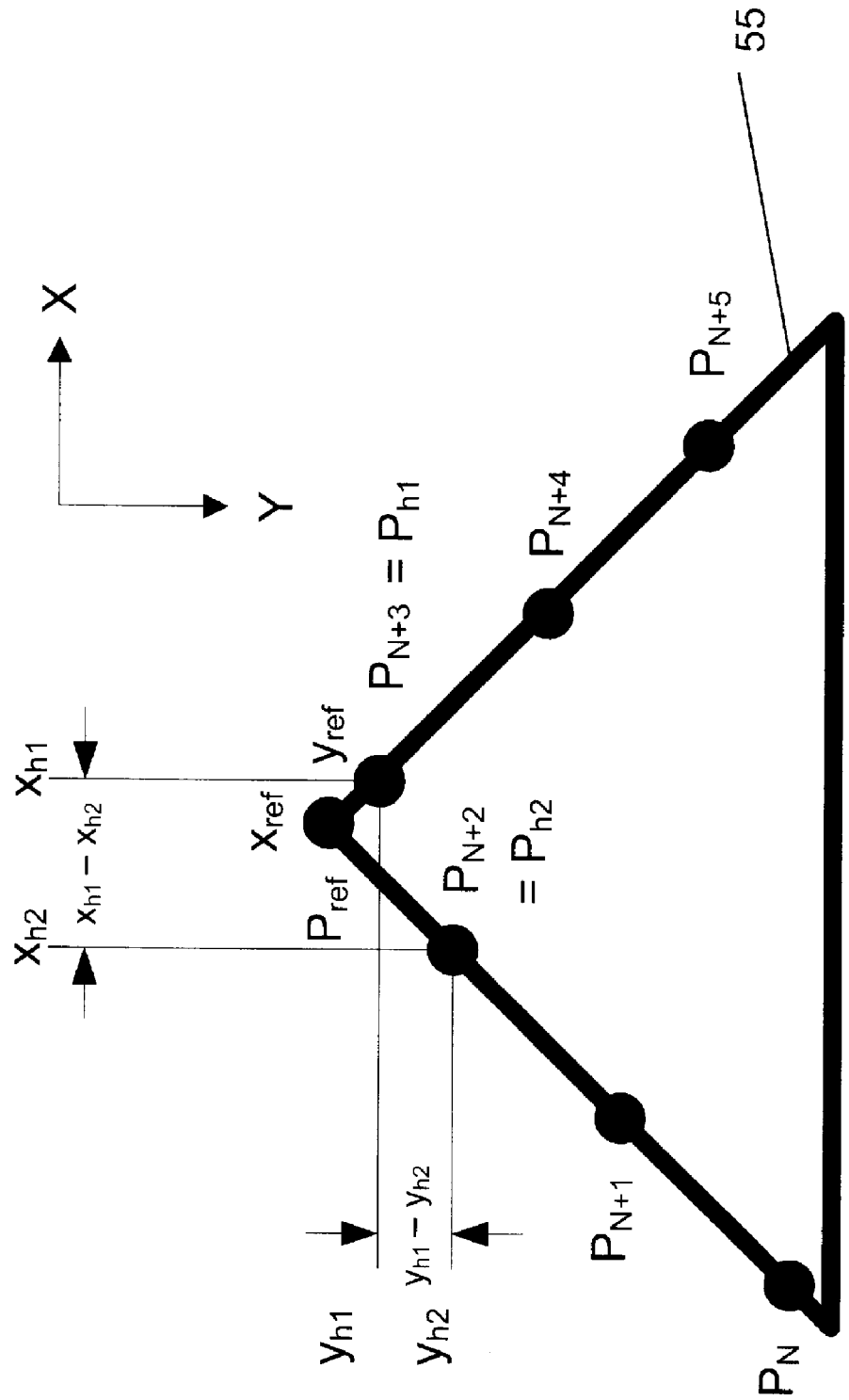
FIG. 10 illustrates scan points and data obtained from a laser scan of the target shape of this invention.
Figure 11:
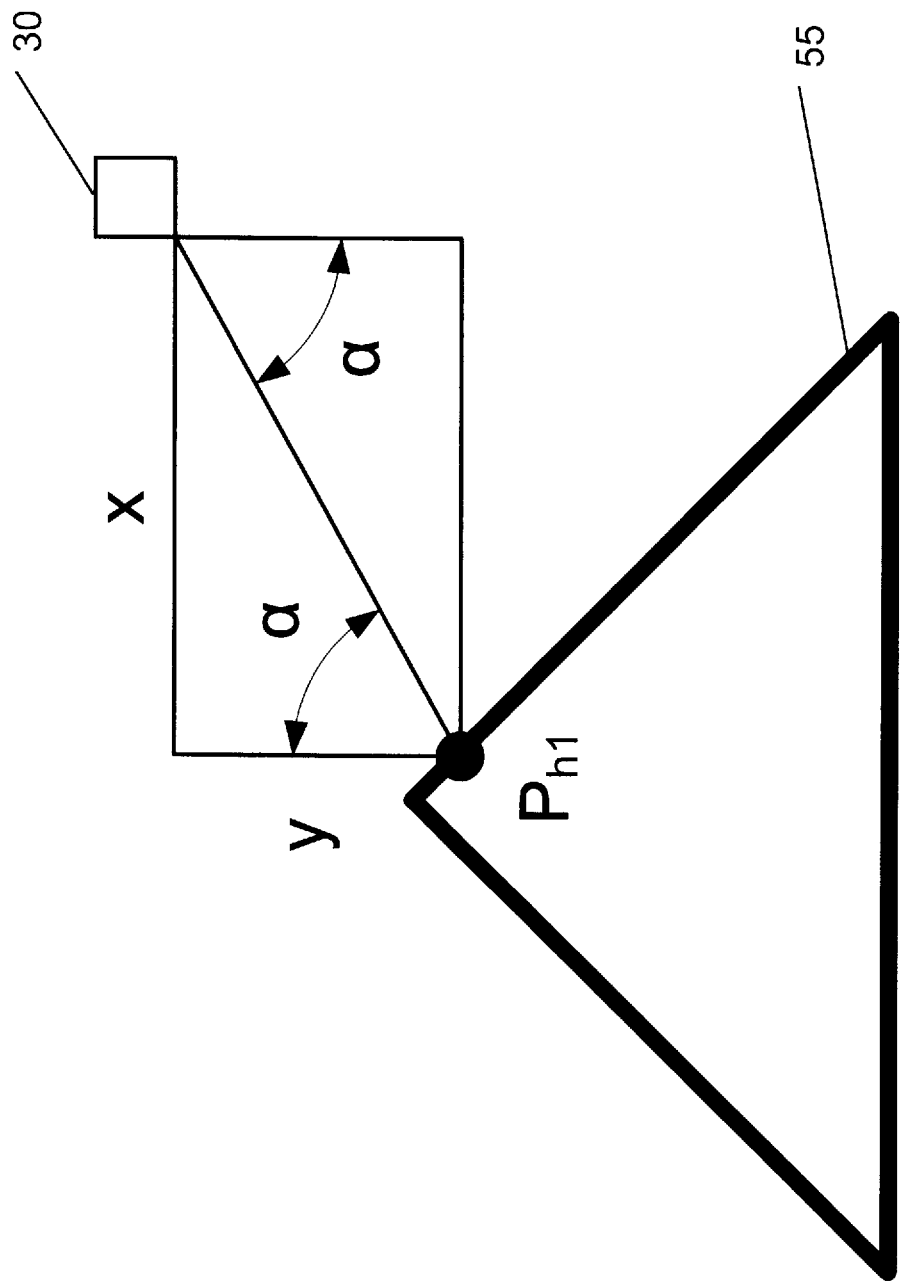
FIG. 11 is a diagram showing the components necessary for calculation of the rectangular coordinates of a reflection point from a target shape to a sensor.

FIG. 10 illustrates data provided from the set of points $P_{[1 \ldots n]}$ that form a laser scan, and the subset of points $P_{[N+1 \ldots N+n]}$ that lie on a target shape 55, where each $P_n$ is a two dimensional point in rectangular coordinates defined by $x_n$ and $y_n$. The problem presented is to find the point with the minimum y value (i.e., closest to the laser scanner), $P_{h1}$, and the point with the second highest y value (i.e., the second closest point to the laser scanner), $P_{h2}$. These points are those having the shortest ($P_{h1}$) and second shortest ($P_{h2}$) travel times for pulses reflected from target shape 55. Since the distance d for each of these two pulses can be calculated based on the speed of the pulse (d=½*Time*speed of pulse) and since the angle α at which the pulse is transmitted is also known, the rectangular coordinates for a desired point of reflection from target shape 55 back to sensor 30, such as $P_{h1}$, as shown in FIG. 11, are easily calculated using the following trigonometric functions:

$$x = d * \sin(\alpha)$$

$$y = d * \cos(\alpha)$$

Given this data for $P_{h1}$, and $P_{h2}$, the reference point position of target shape 55 in the X-axis is defined as:

$$x_{ref} = x_{h1} - ((x_{h1} - x_{h2})/2) + ((y_{h1} - y_{h2})/2)$$

Once $x_{ref}$ for a particular target shape is identified, the position of the edge of the spreader associated with that target shape is calculated with respect to the location of the corresponding sensor by simply adjusting $x_{ref}$ to account for the known distance of the target shape to the edge of the object or spreader on which it has been placed. The $y_{ref}$ corresponding to the $x_{ref}$ is already known since the configuration and position of each target shape 55 is known as is the scan path of the corresponding sensor 30. In addition, because of the right-angle shape of target shape 55 in the preferred embodiment, there is a one-to-one correlation between the position of the peak of the triangle (Y axis) and the side-to-side offset (X axis). After the location of three edges have been so identified, the exact position of the spreader in all six degrees of freedom is established since the dimensions of the spreader are known. This adjusted x-axis data is used by the crane computer controller in conjunction with the provisional positioning data obtained when initially moving frame 15 and trolley 10 to the expected position of container 25 to properly position the spreader for accurate loading or pick-up of containers from a stack. To increase the efficiency of the process, the search for $P_{h1}$ and $P_{h2}$ within the data provided from scan points can be restricted to an appropriate region of interest where the reference target can be expected to be found in the scan.

Figure 12:
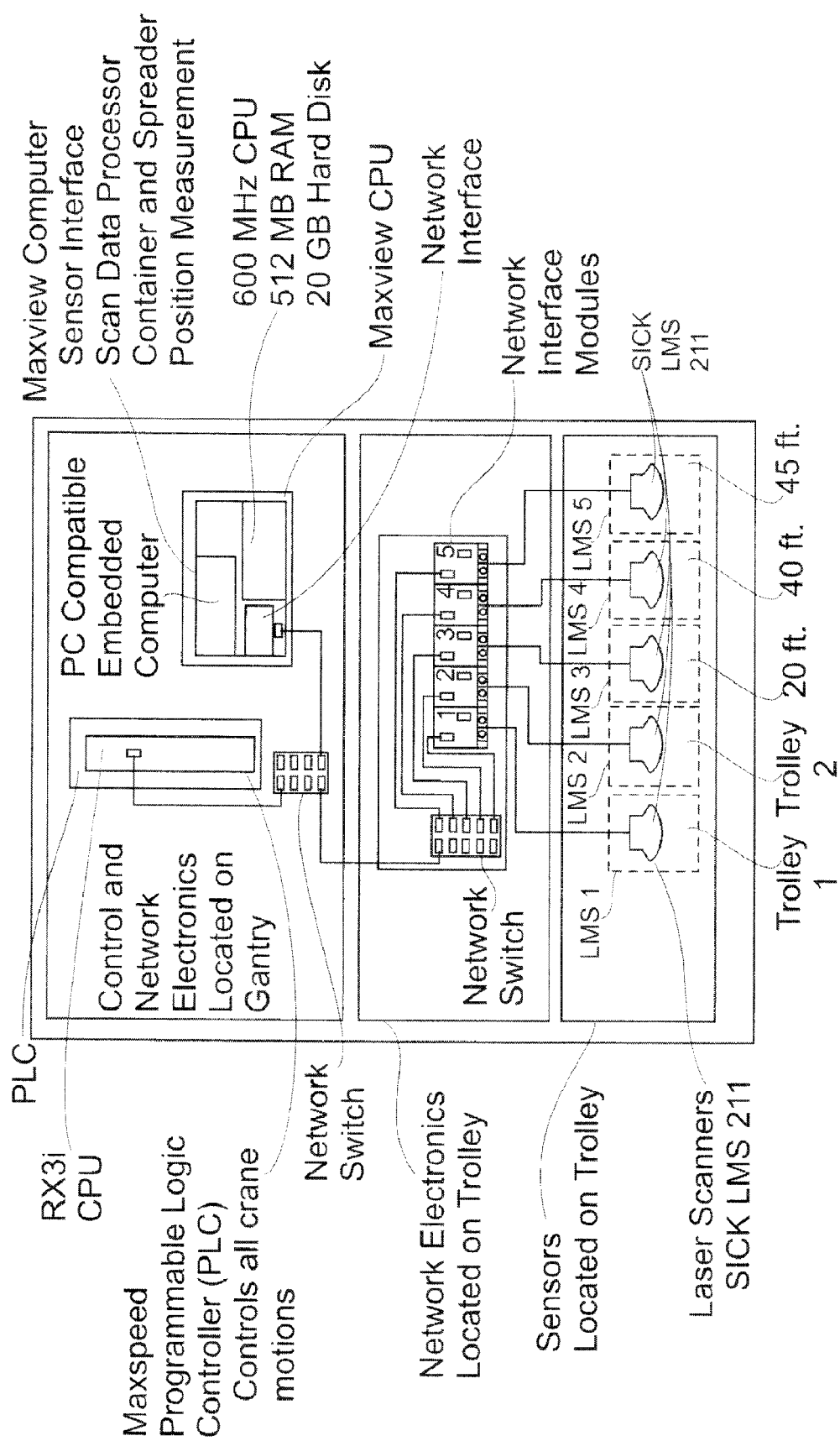
FIG. 12 provides an overview in block diagram form of electronic components used in a system incorporating the method of this invention.

FIG. 12 provides an overview in block diagram form of electronic components used in an exemplary system employing the method of this invention. These components include control and network electronics located on a gantry crane, network electronics located on the crane trolley and scanners located on the crane trolley. The computer means needed to implement the method of this invention when used in a container loading environment may be located on the crane gantry. The computer means is typically a PC-compatible computer having at least a 600 MHz CPU, 412 MB of RAM and at least 20 GB of memory on a hard drive or other similar device as well as a display device. The computer controls overall operation of the crane system but is also responsible for calculating the edge position of spreader 20 with regard to trolley 10. In this regard, the computer measures and stores the time elapsed between emission of a pulse from each sensor 30 and receipt back of a reflection of that pulse. Depending on the type of pulse used and its known speed, the computer calculates the distance travelled by each pulse from sensor 30 and uses this data, as explained above, to further determine which two pulses have been reflected back from the highest and second highest elevation points or edges of target shape 55. The measurements relating to these two pulses are then used to calculate the reference point position in the x-axis of each target shape 55. These reference points are then further adjusted for the known distance in the x-axis of the highest elevation point on each target shape 55 from the edge of spreader 20. When adjusted yet again by the computer for the expected approximate position of spreader 20, an accurate position for spreader 20 is obtained.

The method of this invention may be employed with a multiplicity of types of pulses and in a variety of environments. For example, radio frequency pulses such as RADAR, and acoustic pulses may be employed in addition to light pulses so long as a pulse transceiver is used which is capable of emitting and receiving pulses in a succession of varying, known angles. Other applications for this method include hook and load positioning by cranes, vehicle navigation and control including ground and air vehicles as well as spacecraft, laboratory tool and table positioning and positioning at the micro- and nanometer levels. It is also possible to use a three-dimensional target shape incorporating other than a right triangle. In such cases, databases of key geometrical parameters of the chosen shape could be stored in the computer and could be used as a basis of comparison with the measured points after establishing an appropriate pattern matching algorithm. The incorporation of a right triangle in the preferred embodiment resulted from the simplicity with which the matching algorithm presented above could be derived.

The foregoing invention has been described in terms of the preferred embodiment. However, it will be apparent to those skilled in the art that various modifications and variations can be made to the disclosed apparatus and method without departing from the scope or spirit of the invention and that legal equivalents may be substituted for the specifically disclosed elements of the invention. The specification and examples are exemplary only, while the true scope of the invention is defined by the following claims.

What is claimed is:

1. A computer-controlled method based on time lapse measurement of pulse emission reflections travelling at a known speed for establishing the location of the edges of a first object having known dimensions, a known shape, a top surface, a bottom surface and capable of movement with six degrees of freedom with respect to a second object having known dimensions, a known shape, a top surface, a bottom surface and a known position based on rectangular coordinates wherein the bottom surface of the second object opposes and is spaced away from the top surface of the first object and a range within which the rectangular coordinates of the first object is expected to be is known comprising:

attaching at least three pulse emitters to the bottom surface of the second object, one on each of three sides thereof at known locations and having known orientations, each capable of emitting a sequence of pulses over a known period of time through a sequence of known angles from the perpendicular over a known path;

securing at least three three-dimensional target shapes to the top surface of the first object at known locations and in known orientations wherein each target shape has a known configuration, known dimensions and at least one edge or at least one point with an elevation higher than any other edge or point of said target shape;

affixing at least three pulse receivers, each of which is co-located with one of said pulse emitters, to the bottom surface of the second object;

adjusting the known path of each of said pulse emitters to cross over a highest elevation point of one of the target shapes;

storing in the computer's memory data for each target shape its elevation at its highest point or edge, the distance in the x-axis from a highest elevation point of each target shape to an edge of the first object, the y-axis value $y_{ref}$ of its highest elevation point where the path of the pulse emitter meets that point, the speed S of the pulses being emitted by each pulse emitter and the sequence of known angles at which pulses are emitted by each pulse emitter;

associating data for each target shape with a specific pulse emitter;

directing a series of pulses at a known speed S from each pulse emitter towards the top surface of the first object wherein each pulse is emitted at a different known angle from the perpendicular at a known point in time over a known path;

receiving a reflection from each pulse which has hit the top surface of the first object at a pulse receiver and storing an elapsed time T from emission to reflection reception associated with each pulse;

for each pulse emitted, storing the angle α at which that pulse was emitted and calculating the distance d between the pulse emitter and the surface from which the pulse has been reflected according to the formula $d = \frac{1}{2} * T * S$ after a sequence of pulses is completed, selecting the pulses $P_{h1}$ and $P_{h2}$ for each pulse emitter for which d has the smallest and the second smallest value, respectively;

further calculating the rectangular coordinates $x_{h1}$ and $y_{h1}$ for $P_{h1}$ and $x_{h2}$ and $y_{h2}$ for $P_{h2}$ of the target shape associated with each pulse emitter;

determining the location $x_{ref}$ in the x-axis of the highest point on each target shape according to the formula $x_{ref} = x_{h1} - ((x_{h1} - x_{h2})/2) + ((y_{h1} - y_{h2})/2)$ further determining the location in the x-axis of three edges of the first object by retrieving the distance of the highest elevation point of each of three target shapes to an edge of the first object from computer memory and adjusting the $x_{ref}$ of each of the three target shapes to account for that distance; and combining the $x_{ref}$ and $y_{ref}$ for each of the target shapes to establish an accurate rectangular coordinate position for the first object.

2. The method of claim 1 wherein the first object is an automatic container handler spreader and the second object is an automatic container handler trolley.

3. The method of claim 1 wherein prior to selecting, all data for pulses occurring outside of the range of rectangular coordinates within which the first object is expected to be is eliminated.

4. The method of claim 1 wherein each pulse emitter and each pulse receiver is replaced by a pulse transceiver.

5. The method of claim 1 wherein further calculating for each pulse $P_{h1}$ and $P_{h2}$ is accomplished pursuant to the formulae $x = d * \sin(\alpha)$ $y = d * \cos(\alpha)$.

* * * * *